United States Patent [19]

Kahn et al.

[11] Patent Number: 4,918,595
[45] Date of Patent: Apr. 17, 1990

[54] SUBSYSTEM INPUT SERVICE FOR DYNAMICALLY SCHEDULING WORK FOR A COMPUTER SYSTEM

[75] Inventors: Kenneth A. Kahn; Robert M. Martinez, both of Poughkeepsie, N.Y.; Juha P. Vainkainen, Espoo, Finland

[73] Assignee: International Business Machines Corp., Armonk, N.Y.

[21] Appl. No.: 80,371

[22] Filed: Jul. 31, 1987

[51] Int. Cl.⁴ .............................................. G06F 15/16
[52] U.S. Cl. ................................ 364/200; 364/281.3; 364/286; 364/281.8; 364/976; 364/300
[58] Field of Search ... 364/200 MS File, 300 MS File, 364/900 MS File

[56] References Cited

U.S. PATENT DOCUMENTS

| | | | |
|---|---|---|---|
| 4,387,427 | 6/1983 | Cox et al. | 364/200 |
| 4,495,562 | 1/1985 | Yamaji et al. | 364/200 |
| 4,615,001 | 9/1986 | Hudgins, Jr. | 364/200 |
| 4,636,942 | 1/1987 | Chen et al. | 364/200 |
| 4,636,948 | 1/1987 | Gdaniec et al. | 364/300 |
| 4,736,318 | 4/1988 | Delyani et al. | 364/200 |
| 4,839,798 | 6/1989 | Eguchi et al. | 364/200 |

OTHER PUBLICATIONS

"Using Other Programming Languages to Support APL" by Thomas E. Cook, APL80-International Conference on APL, Jun. 24-26, 1980, pp. 299-304.
"DMERT Operating System" by M. E. Grzelakowski et al. The Bell System Technical Journal, vol. 62, No. 1, Part 2, Jan. 1983, pp. 303-322.
IBM TDB vol. 23, No. 12, May 1981 by J. D. Palmer "Multiple Vertical Storage/Job Entry Subsystem Using Queies".

Primary Examiner—Gareth D. Shaw
Assistant Examiner—Gopal C. Ray
Attorney, Agent, or Firm—Lawrence D. Cutter; Joseph A. Biela

[57] ABSTRACT

An improved internal reader function is disclosed in which all internal reader jobs are dynamically created (and scheduled) and canceled. The operator no longer needs to guess how many internal readers to create and cancel in order to handle the ever-changing computer system workload. Instead, a subsystem of the computer system operating system continuously and optimally handles the workload by automatically creating new internal reader jobs or assigning work to previously automatically created internal reader jobs which have completed processing and are waiting for additional work, i.e. data sets, to be processed. To handle this dynamic processing, a control block structure is created to keep track of the internal reader jobs. The improved subsystem also eliminates "Bottlenecks" since all data sets to be processed are transferred directly to an internal reader job data set control block. Therefore, once dispatched, the internal reader job uses its own job data set control block to locate the data set to be processed.

10 Claims, 9 Drawing Sheets

SUBSYSTEM INPUT SERVICE FOR DYNAMICALLY SCHEDULING WORK FOR A COMPUTER SYSTEM

BACKGROUND OF THE INVENTION

1. Field of the Invention

The present invention relates generally to a method for eliminating the bottleneck created in a large interactive computer system environment when jobs are submitted to a component of an operating system faster than the component can receive them. It relates specifically to an improved internal reader function of the operating system for dynamically and efficiently processing job-created input streams.

2. Description of Prior Art

An internal reader (INTRDR) is a subsystem function of the IBM Multiple Virtual Storage/Extended Architecture (MVS/XA) operating system. In particular an internal reader is a function of the job entry subsystem (JES3) of an interactive computer system.

MVS/XA—managed environment: The computer systems that MVS/XA manages such as models of the IBM 3090 complex are capable of multiprogramming, i.e. executing many programs concurrently. For example, hundreds of jobs can be executed simultaneously for time-sharing users who could be at distant geographical locations. The computer systems that MVS/XA manages are also capable of multiprocessing, i.e. simultaneous operation of two or more processors that share the various system hardware devices. MVS/XA provides each user with a unique address space (virtual storage addresses) and maintains the distinction between the code and data belonging to each address space.

MVS/XA organizes each job in a system as tasks and attempts to process each one. The tasks for one job generally compete with one another, and with tasks related to other jobs, for use of system resources. A component of the MVS/XA operating system, the supervisor, controls the progress of the tasks through the system. The supervisor allocates resources (other than input/output (I/0) devices) and maintains current information about each task so that processing can resume from the appropriate point in case the task is interrupted.

Modules of the MVS/XA operating system normally store the information needed to control a particular task or manage a resource in defined areas called control blocks. Control blocks representing many tasks of the same type may be chained together on queues, i.e. each control block contains the starting address of (points to) the next one in the chain. A program can then search the queue to find the data for a particular task or resource which might be: an address of a control block or required routine, actual data (value, parameter or name) and/or status flags. All fields in a control block are predefined.

Communication between MVS/XA components or subsystems (programs) occurs due to the use of common macro instructions. These instructions invoke segments of program code that map frequently used control blocks or perform frequently used system functions. Macros exist for such functions as opening and closing data files, loading and deleting programs, and sending messages to the system operator.

The job entry subsystem (JES3): A subsystem, such as JES3 12, communicates with MVS/XA through a subsystem component known as the subsystem interface (SSI) 14 as shown in FIG. 1a. MVS/XA manages each job (a JCL (Job Control Language) statement in an input stream) during execution while the job entry subsystem of the operating system manages each job before and after execution. In this case, an MVS/XA operating system requires the JES3 in order to process each job. JES3 reads an input stream (a collection of jobs) which are identified by a JCL statement and performs work to prepare those jobs for execution. That work can be related to a specific job from the input stream, or it can be related to work JES3 must perform in its role of coordinating the preparation of many jobs for MVS/XA execution. There may be special kinds of JES3 jobs where no JCL is involved. JES3 reads each job in the input stream and places it on at least one direct access storage device (DASD) also known as a spool device. A spool device serves as a buffer between input devices and routines that read input data, and between routines that write output data and output devices; storage place for the control blocks and data JES3 builds to process jobs; and, a collection point for data to be distributed to individual processors in a multiprocessing environment. SPOOLing is the temporary storing of jobs and job-related data in intermediate stages of processing on the spool device so that they are readily accessible. Since each job has a job class, priority, and output class, JES3 selects jobs from the spool device for execution in a way that encourages the efficient use of system resources.

JES3 processing occurs in six stages: entry, conversion/interpretation, device allocation, scheduling a job for execution, output and purge. On entry, JES3 reads a collection of jobs from an input/output device such as a card reader, remote terminal, another MVS or MVS/XA system, tape drive or DASD. Each job itself could create input streams. Job-created input streams are processed by a JES3 internal reader program. In general, the internal reader transfers an input stream from an output service, i.e. an output queue, to the JES3 input service, i.e. an input queue, to be processed. That is, any job executing in MVS/XA can use an internal reader to pass an input stream created by the job to JES3, and JES3 can receive multiple job-created input streams concurrently through multiple internal readers. The job-created input stream is not entered from a device such as a card reader, remote terminal or direct access device. Instead, the input stream is created by a job as an output data set, e.g. a data set containing job control language (JCL) and/or data and/or JES3 control statements and comments.

JCL is a special batch language which is used to create MVS/XA data sets. A special JCL statement is used to allocate a data set to the JES3 internal reader. In other words, a job creates an output data set and requests that it be processed as a job by coding the destination as SYSOUT=(*, INTRDR) in the data set identifying (DD) statement. The statement has the form //ddname DD SYSOUT =(*,INTRDR) in which "ddname" is the name the batch program will use to open, access, and close the data set. "DD " is used to allocate a new or already existing data set. "SYSOUT" identifies this data set as a system output data set, i.e. a SYSOUT data set. "INTRDR" indicates to JES3 that the SYSOUT data set is to be sent to the JES3 internal reader as an input job stream. (SYSOUT is a data set that is managed by JES3 and is discussed below.) This eliminates the need to reenter job-created input streams in the conventional manner using an I/0 device. In general, the JES3 internal reader program transfers a job-produced input stream (an output data set such as SYSOUT) directly to JES3 input service programs that normally process jobs obtained from I/0 devices. As JES3 reads the input stream, it assigns a unique job ID to each job (in the input stream) and places each job's JCL, optional JES3 control statements, and input data into spool data sets. The input stream jobs are then selected from the spooled data sets for processing and subsequent execution.

Batch jobs are selected by JES3 in response to requests for work from the initiator function of the MVS/XA job scheduler. They run in the initiator's address space. (An initiator is an MVS/XA system program that is started by either the operator or JES3 in order to request, and subsequently execute, batch jobs submitted via JES3.) Jobs created by TSO LOGON, the MOUNT command, or the START command (discussed below) are selected for processing when they are entered by a process known as "demand select". These jobs run in their own address spaces.

In the C/I (Conversion/Interpretation) stage, JES3 uses a converter program to analyze each (input stream) job's JCL statements. The converter takes the JCL and converts it into internal text that is recognized by JES3 and the job scheduler functions of MVS/XA. JES3 then calls the interpreter function to further analyze the JCL and build control blocks. Both the internal text and control blocks are then stored in the spool data set.

A job generally needs to use I/0 devices, such as tapes or DASDs and data sets when it runs. MVS/XA assigns these resources to jobs through a function called "device allocation". Device allocation uses the information in the job's JCL statement to assign the proper resources to the job. The job is then passed to an MVS/XA initiator.

The scheduling phase of JES3 responds to requests for jobs from the MVS/XA job initiator function. JES3 will select a job from a job queue on a spool data set and make it available for the initiator.

JES3 controls all system output (SYSOUT) processing. SYSOUT data is produced by jobs during execution. While running, a job can produce system messages that must be printed, as well as data sets that must be printed or punched. After completion of the job, JES3 analyzes the characteristics of the job's output in terms of its output class and setup requirements and processes its output accordingly. Specifically, JES3 gathers the output data by output class, device availability and process mode, then queues it in the SYSOUT data set temporarily on the spool device for output processing. That is, MVS/XA creates a temporary SYSOUT data set on the spool device to contain the records written to the SYSOUT data set. (After job execution, JES3 prints or punches the SYSOUT data to the appropriate output device. The printers and punches are JES3 devices, identified as such during system initialization.)

At the purge stage, when all processing for a job is completed, JES3 releases the spool space assigned to the job, making it available for allocation to subsequent jobs.

JES3 input service programs: JES3 programs, called dynamic support programs (DSPs), perform the work JES3 is required to do to prepare jobs located in the input stream for execution. There are three types of DSPs:

1. Resident DSPs that are a fixed part of JES3 processing.
2. DSPs that are invoked by an operator command (* CALL DSP name).
3. DSPs that process units (or items) of work required by a job.

When JES3 processes a job, the eventual result is the execution of one or more DSPs. In general, DSP 18 as shown in FIG. 1b handles one unit of work and performs one particular function, but its work is accomplished through a pair of JES modules, i.e. a driver module 20 and a data CSECT 22. (The data CSECT contains work areas, constants and common routines used by the driver module and other modules that the driver module invokes. Not all DSPs however, require their own data CSECT.) JES3 uses internal reader dynamic support program (INTRDR DSP) routines to handle the transfer of job-produced input streams to the JE83 input service. A DSP is automatically initiated when a job is created that has scheduler elements. The DSP is, itself, a JES3 task. JES3 provides for its own internal dispatching using the DSP. The operator invokes as many internal reader dynamic support programs, i.e. copies of the INTRDR DSP, as necessary by using the *,INTRDR command in order to handle the current load of JES3 job-created input streams to be transferred to the input service.

In general, all DSPs are dispatched using the JES3 master dispatching queue called the function control table (FCT) chain 24 as shown in FIG. 1b. Every DSP corresponds to one or more FCT entries in the FCT chain as suggested by line 26 "connecting" DSP 18 with FCT entry 24a. JES3 dispatches an FCT entry in very much the same way as MVS/XA dispatches a task control block (TCB). The FCT entry representing a DSP i one element on a chain of elements comprising the FCT chain. The FCT chain elements are arranged from highest to lowest priority according to the priority assigned to the DSP. In general, FCT entries represent JES3 dispatchable units of work for all jobs.

There are two types of FCT entries: resident and non-resident FCTs. Resident FCT entries are not dynamically added or removed from the dispatching queue. These resident FCT entries represent DSPs that perform required JES3 functions like operator communication and output services. Non-resident FCT entries are added and deleted from the dispatching queue as needed. These non-resident FCT entries perform operator utility functions as well as the core processing of JES3.

A JES3 job is defined by a control block called a job control table (JCT) entry 30 as shown in FIG. 1c. The JCT job structure is created by JES3. (An MVS/XA job defined by a JCL JOB statement is analogous to a JES3 job defined by a JCT entry.) Every JCT entry contains the JES3 job to be performed, i.e. the characteristics of the job, and one scheduler element for each unit of work that must be done (in sequence) to process that particular job. As shown in FIG. 1c, a scheduler element represents a stage of the JES3 job to be processed, i.e. the C/I stage (32), the MAIN stage or device allocation stage (34), the SYSOUT output processing stage (36) and the purge stage (38). These scheduler elements, representing units of work, are processed sequentially, and each is represented on the FCT chain by a DSP that performs the work required for that specific scheduler element. In general, the scheduler elements in a JCT entry represent units of work for a specific MVS/XA job. A job segment scheduler (JSS) selects scheduler elements that are ready for processing and builds entries on the FCT chain 24 as shown in FIG. 1d so that DSPs representing those scheduler elements (32–38) will be dispatched to do the work required by those scheduler elements. The JSS scans the job queue (the FCT chain) in priority order, finds a job that has a scheduler element to be processed, builds a resident queue element control block (RSQ) for that scheduler element and associates the resident queue with an FCT entry that corresponds to the DSP that will be dispatched to perform the function required by that scheduler element. For each DSP not represented by a resident FCT entry, an FCT entry is built by the JSS and added to the FCT chain. This "new" FCT entry will also represent a DSP that will do the work requested by a scheduler element.

The JSS schedules work, for JES3, that must be done on behalf of an MVS/XA job which is defined by scheduler elements. (The scheduling done by the JSS corresponds to the dispatching done by the multifunction monitor (MFM).) Pointers from the JCT entry to the job's other control blocks are placed into the RSQ. The RSQ, a large in-storage-only control block, is a storage area for status flags, job information fields and queueing pointers. RSQs last only for the life of a scheduler element.

The MFM, the actual JES3 dispatcher, scans the FCT to dispatch the appropriate FCT to accomplish scheduler element work. When the MFM finds a dispatchable FCT entry, it restores the DSP environment from the FCT entry and then passes control to the DSP driver module for processing. The DSP then performs its service and the MFM relinquishes control until the DSP returns control to it. The MFM then saves the DSP environment (register contents, etc.) in the FCT entry for the next dispatching of the DSP. The MFM then begins to scan the FCT again. The JCT-FCT structures permit JES3 to track and schedule work on a job-by-job basis (JCT entries), and to dispatch work on a unit of work (within a job) basis (FCT entries). The JSS provides the interface between the JCT and the FCT by means of the scheduler elements in the JCT and a DSP (which does the work of a scheduler element represented by at least one FCT entry) on the FCT chain. Sources of JES3 jobs: There are several sources of JE83 jobs: normal jobs which are entered either by the MVS/XA internal reader or by locally attached devices such as card readers and DASDs or by remotely attached devices or by another JES3 node (in a networking environment); "demand select" jobs, which occur when an operator issues an MVS START or MOUNT command, or a time-sharing option (TSO) user enters a LOGON command; and, "called jobs" which are created by operator request in response to a JES3 * CALL command.

Internal reader jobs: A job is generally submitted to the JES3 internal reader (discussed below) in one of two ways. One way is through the use of a CLOSE (macro) to close a SYSOUT data set, e.g. one assigned to the internal reader via SYSOUT=(*,INTRDR). In response to the CLOSE macro, MVS/XA invokes the CLOSE SVC routine which sends internal reader job data set (JDS), i.e. SYSOUT data set, information to JES3 via the subsystem interface (SSI). A staging area (STA) will be created which will include a pointer to the SYSOUT data set, i.e. JDS, entry. The STA is sent to the JES3 address space via the SSI. The other way is when a time sharing option (TSO) user interactively submits a job (demand select jobs) via the TSO SUBMIT command. The format at the SUBMIT command is SUBMIT dsn where dsn is a data set containing a job input stream. As a result of the user-issued SUBMIT command, TSO dynamically creates or allocates an internal reader data set, and writes the job control language (JCL) records to the internal reader via SSI. In particular, JES3 will allocate from 2 to 9 spool track groups to the internal reader data set. The data set will be processed as a JES3 multiple record file (MRF). A resource allocation block (RAB) is created in the TSO user's address space. This block is used by JES3 to process read and write requests in the user's address space and contains pointers to all of the spool track groups allocated to the data set. JES3 will create a job data set (JDS) entry for the internal reader data set. The JDS entry contains a pointer to the first record of the data set on spool. This JDS entry is part of the JDS block corresponding to the internal reader job representing the TSO user. TSO will read in all records from the data set specified by the SUBMIT command and write them back to the internal reader data set. When all of the records have been transferred, TSO will send the internal reader data set to the JES3 address space. A staging area (STA) will be created which will include a pointer to the internal reader data set JDS entry. The STA is sent to the JES3 address space via the SSI. In both cases, the SSI request to process data sets is sent to the JES3 address space. A module (IATMSGC) receives the request and calls another module (IATDMJA) to process the request, i.e. process the STA. The IATDMJA module obtains a job number (AJOBNUM) and then issues a SPINOFF macro. The IATDMJA module calls the module IATOSDR to process the internal reader data set pointed to by the STA as a spinoff data set. That is, module IATOSDR copies the JDS entry of the new input job stream (effectively adding the internal reader data set) to a JOBO JDS block (which is discussed below).

In other words, internally, the output service treats a data set, e.g. a SYSOUT data set, destined for an internal reader as a spin off data set which JES3 can process while the job (that created the data set) is still executing. In doing so, the output service adds an entry (corresponding to the data set) to the JDS block representing a pseudo-job (JOBO) that is created during JES3 initialization. JOBO is strictly used to keep track of spin off data sets created by JES3 DSPs. The output service then builds an output service element (OSE) for the data set and queues the OSE on the output service hold queue. At this point, processing stops until a copy of an internal reader (INTRDR DSP) is dispatched. If there are no free copies of the INTRDR DSP program, nothing happens until the operator invokes (calls) an internal reader using the *,INTRDR command.

JES3 Internal Reader—JOBO

JOBO is a special "pseudo-job" created on a DASD by JES3 during output service initialization. JOBO represents the job stream containing the DD statement. This "pseudo-job" job structure is created with the following control blocks. (These control blocks in relation to the JCT entry are shown in FIG. 1e.)

A job description and accounting block (JDAB) 40 is constructed simultaneously with the JCT entry 30. JDABs provide DSPs with data about jobs and make JCT access unnecessary. In general, entries representing each scheduler element in a JCT are appended to the JDAB to provide DSP accounting for each DSP needed for the job.

A job data set (JDS) 42 control block is constructed during JES3 input service processing and initially contains the data set which contains the JCL for the job (JESJCL), two message data set for system generated messages as well as for messages generated by DSPs (JESMSG), and any SYSIN data for the job (JESIN). Entries for (pointing to the) SYSOUT data sets (discussed previously) are added to the JDS when the data sets are opened during MVS/XA execution. This job data set also contains the records written to the SYSOUT data set.

A job management record (JMR) 44 control block is built during input service processing and contains the job accounting information.

An output service element (OSE) 46 control block is created to contain a set of SYSOUT data set characteristics relating to one or more data sets to be managed during output service processing. The first OSE for a job is constructed during input service processing and written to a spool volume. Later, during output service processing, this OSE is completed and others may be generated for the job. These elements become the "output queue".

A job track allocation table (JBTAT) 48 is created and is a list of spool track groups allocated to a job.

There are other job related control blocks that are not necessary to discuss for an understanding of the implementation of the invention described herein.

Since no JCT is created with JOBO, JOBO is ineligible for scheduling by JSS because there are no scheduler elements. (That is, the JDAB will not have any scheduler elements which JSS can use to build entries in FCT.) JES3 merely uses JOBO to store spinoff data sets, provided by the following, until they can be processed by the output service:

1. all internal reader data sets;
2. spinoff data sets created by JES3 DSPs; and
3. jobs submitted from other systems via a systems network architecture/network job entry network.

The spinoff data sets that were created by jobs executing in MVS/XA and that are stored on JOBO are submitted directly to JES3 output service using internal reader programs.

Internal Reader Processing: MVS/XA processes data sets allocated to the internal reader by sending them to JES3 via the SSI which provides the communication interface between MVS/XA and one or more subsystems like JES3. In effect, MVS/XA requests services from JES3 by using the SSI. Some requests can be handled entirely by JES3 SSI modules in the caller's address space. However, in most cases, the request needs the services of the JES3 address space. In the JES3 address space, the SSI request is processed by module IATMSGC which, in turn, calls module IATDMJA. IATDMJA submits the data set to spinoff processing via the JES3 SPINOFF macro as explained above.

The SPINOFF macro is processed by module IATOSDR. IATOSDR will read in from the spool device each single record file (SRF), i.e. each entry, of the JDS belonging to JOBO. IATOSDR will stop once it finds a free JDS entry or when it gets to the last SRF in the JDS, i.e. SRF, chain. If a free JDS entry is found, IATOSDR will copy the (internal reader) data set into the JDS entry. Otherwise, a new JDS entry will be created in the last SRF of the chained SRFs and the data set will be copied into the "new" JDS entry.

The JES3 internal reader (INTRDR) is a "called job" (a request) which is not defined by JCL. (This called job is internally generated by JES3 in response to the *CALL command.) The JCT entry corresponding to this called job contains an INTRDR scheduler element, representing the DSP, i.e. INTRDR DSP, needed for this request (to process the data set in a JOBO JDS entry), and a purge scheduler element. When the INTRDR DSP is dispatched, it reads the OSE for the data set, locates the appropriate entry in the JOBO's JDS and calls the JES3 input service to process the data set as an input stream. The driver module for the INTRDR DSP created by JSS is IATISIR. IATISIR calls the normal JES3 input service DSP driver, IATISDV, to process the data set. IATISDV issues the IATXOSPC macro which invokes a JES3 output service routine to scan the JOBO JDS chain for a JDS pointer to an internal reader (spinoff) data set on JOBO. If it finds one, a pointer to the JDS entry on JOBO is passed back to IATISDV, which then loads and processes another module (IATISLG) to process the data set on JOBO as if it came from a physical card reader. Input service then builds the usual job control blocks for the data set, including a new JDS for the job, and releases the JDS entry, corresponding to the original output data set, from JOBO's JDS. When the data set or job stream in the JOBO JDS entry has been processed, i.e. upon return from the IATISLG module, IATISDV will again issue the IATXOSPC macro to find more internal reader work. If another JDS entry is found, control is returned to the IATISLG module to process the data set on JOBO. The above procedure will continue until JES3 output service cannot find any more JOBO JDS entries for the internal reader. That is, control returns to IATISIR which then enters a wait state. IATISIR will stay in this wait state until another internal reader data set is spun off by IATDMJA. In this case, IATOSDR will force IATISIR out of its wait state after it adds the JDS pointer to the data set to a JOBO JDS entry. IATISIR will then call IATISDV and then go into the wait state again following the processing of at least one other internal reader data set. This process continues until the internal reader job is removed from the system.

Internal reader jobs are started and ended manually by system operators. In order to start an internal reader, the system operator issues an *X, INTRDR from a system console. Once issued, control passes to the internal reader driver (IATISIR). (To remove an internal reader job, the system operator would issue an internal reader *C INTRDR from a system console.) This manual process means that the system operator would have to determine (guess) how many of these jobs would be needed to handle a specific work load. If his guess was too low, then there would not be enough internal readers to efficiently handle the work load. If his guess was too high, then the system would have the overhead of maintaining one or more idle internal readers, each one represented by an FCT which would have to be scanned by the MFM to determine that it did not have to be scheduled.

The above process creates a "bottleneck", in a large interactive computer system environment, when jobs (requests) are submitted to the JES3 input service at a rate that is faster than JES3 can receive them Of course, the length of the queue is shortened each time a request is processed, but if requests arrived at a rate faster than they can be processed, the queue can get very long. This results in a very long JOBO JDS chain, causing a backlog in output service select processing because time consuming I/0 is required to access one entry (record) in the chain at a time, and the entire chain has to be read in order to determine where a "new" record has to be added if necessary. In other words, all requests to process background jobs from all sources are queued on a single (long), disk resident JDS queue that is "anchored" to a special permanent job referred to as JOBO. As a result, the time for executing jobs submitted to the background for execution from TSO users at terminals running as foreground sessions is prolonged. When this occurs, users become frustrated because their job has been accepted for processing, e.g. by the time sharing option (TSO) SUBMIT instruction, but it cannot be located. That is, the user cannot determine the status of his/her job, e.g. by using the TSO STATUS command or the operator's INQUIRY command, prior to the job being given a job number.

Another problem is the delay of demand select job processing, e.g. TSO LOGONs and started tasks (initiator). This is a result of the following:

1. As more jobs are added to JOBO, its JDS increases proportionally in size by the addition of chained (SRF) records. This results in longer search times, i.e. search of the chained records, as the number of input/output (I/0) calls increase because each SRF record must be read from disk storage and, if changed, written back to disk storage. The program which processes the long JDS chain is also responsible for processing TSO LOGONs.

2. The module IATMSGC controls the processing of the JOBO JDS (via calls to another module (IATDMJA)). However, module IATMSGC is also directly involved in processing demand select requests, e.g. TSO LOGON, the MOUNT command and the START command. Since module IATMSGC is a DSP driver with a DSP maximum use count of one, it can only process one request (job) at a time. This results in competition for processing time between internal reader jobs and demand select requests. This, of course, creates excessively long times for TSO users to log on to the system. If module IATDMJA is spending an inordinate amount of time on I/0 while processing internal reader jobs, demand select jobs will be delayed, or even stopped, if the JOBO JDS is in use. (Even without the JOBO internal reader support, performance studies have shown that the IATDMJA module is a source of a major I/0 performance bottleneck.)

If, deterministically, a particular number of internal readers is selected to be in the system at all times, then, depending upon the amount of work, size of the system, number of users, etc., that specific number of internal readers may be too many or too few. If it were too few, the "bottleneck" would occur again. If it were too many, those internal readers waiting for work would consume system resources, virtual and real storage and, most importantly, cycles required by the dispatcher to scan the queue of jobs looking for actual work to dispatch. Also, looking to the future, a specific number of internal reader jobs "optimally" selected for todays system could create a "bottleneck" in a future system that was much faster than todays system and capable of handling more workload. This would be especially so if I/0 speeds do not keep pace with improvements in processor speeds.

It is therefore an object of this invention to eliminate the bottleneck caused by jobs being submitted to an operating system component faster than the component can receive them.

It is an object of this invention to dynamically, i.e. automatically and continuously, create and cancel internal reader jobs which are available to process the ever-changing number of input job streams while at the same time avoiding excessive system overhead and thrashing.

An object of this invention is to eliminate the need for operators to manually start or cancel internal reader jobs as the number of data sets to be processed varies over time.

SUMMARY OF THE INVENTION

An interactive computer system is disclosed and claimed which has an operating system that communicates with a subsystem which prepares a job for execution by the operating system. The computer system further includes a support program which processes a unit of work required by the job, a function control table chain in which one entry in the chain corresponds to the support program, a scheduler element in the job which corresponds to the unit of work that must be performed to process the job and a data set containing an input stream that was created by the job. The improved subsystem input process comprising the transferring of the data set directly to a job data set control block which is associated with a dynamically created internal reader, creating and adding to a function control table entry an internal reader support program corresponding to a scheduler element in the internal reader job and scheduling the function control table entry, and dispatching the internal reader support program and processing the data set.

DESCRIPTION OF THE PREFERRED EMBODIMENT

The internal reader function of MVS/XA has been improved in order to eliminate the problems and shortcomings of the internal reader function described above. In particular, the single JOB0 is no longer used for internal reader jobs, and the JES3 input service (process) is improved thereby eliminating the above-described "bottleneck". In general, as soon as data sets containing the new job-created input streams are made available via the SSI to the JES3 of MVS/XA (during main service processing), an improved JES3 input service is invoked which includes dynamically (automatically) created multiple internal reader jobs (INTRDR JCTs) on which job requests are queued. The improved JES3 input service includes improved modules IATISDV and IATISIR and new module IATISCD discussed below. The function of the IATISCD includes copying a data set directly to an INTRDR JCT. The IATISCD also creates INTRDR FCTs, when necessary, and adds them to the JES3 job (FCT) queue (or chain) as dispatchable tasks. Once an appropriate INTRDR DSP is dispatched, it uses its own JDS to locate the data set. The INTRDR DSP then invokes the input service (IATISDV) to process the data set as job-created input stream. An internal reader use counter (in an anchor block discussed herein) and a maximum use counter (in the DSP dictionary), i.e. DSP max count, are set during JES3 initialization. The IATDMJA module has been changed to process its' own I/0 requests asynchronously from the IATMSGC module.

Figure 1A:
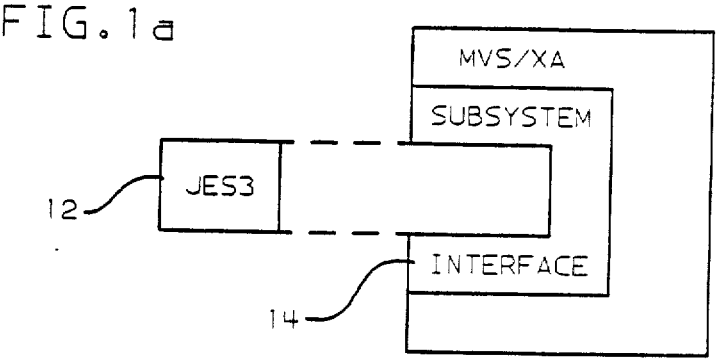
FIGS. 1a-1e are schematic diagrams of the operating system environment and the prior art subsystem input and output services with respect to the internal reader function.
Figure 1B:
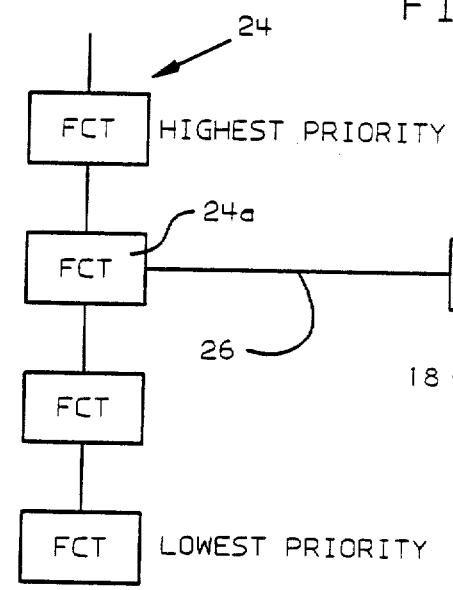
Figure 1C:
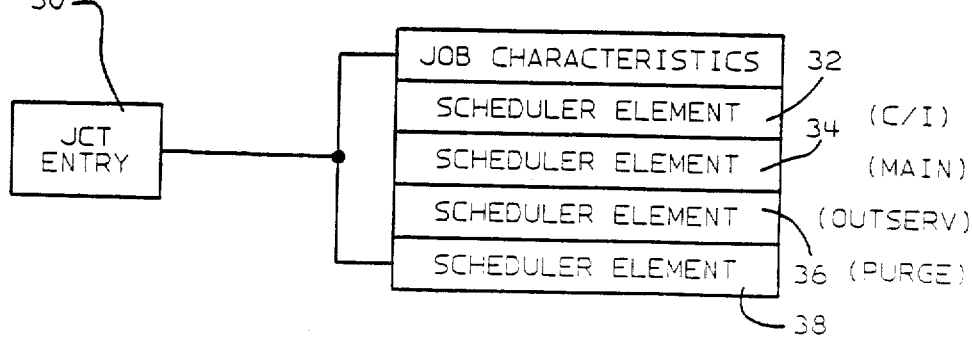
Figure 1D:
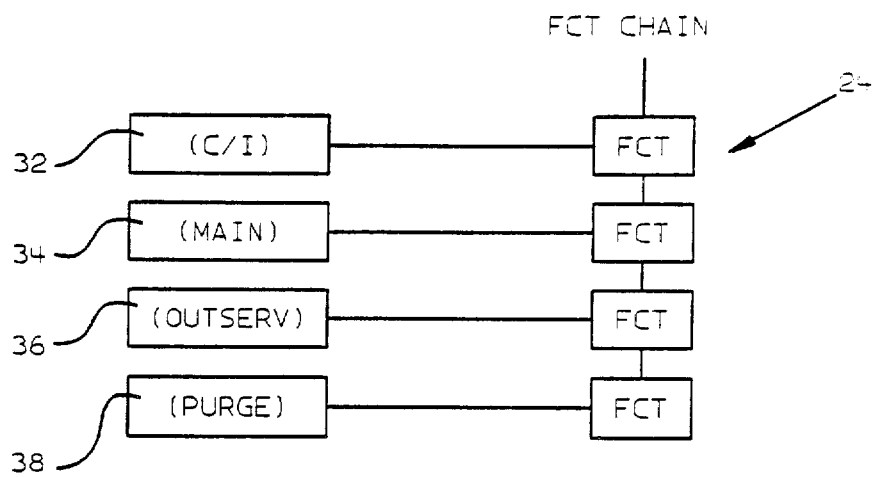
Figure 1E:
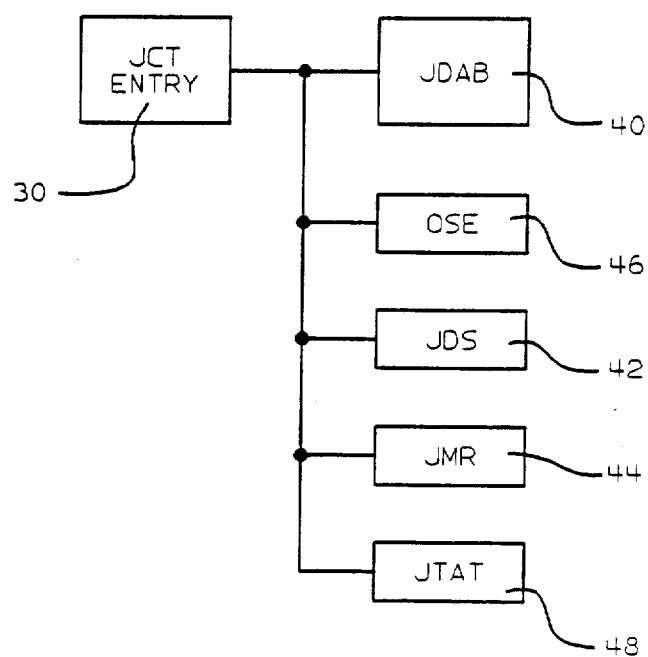
Figure 2:
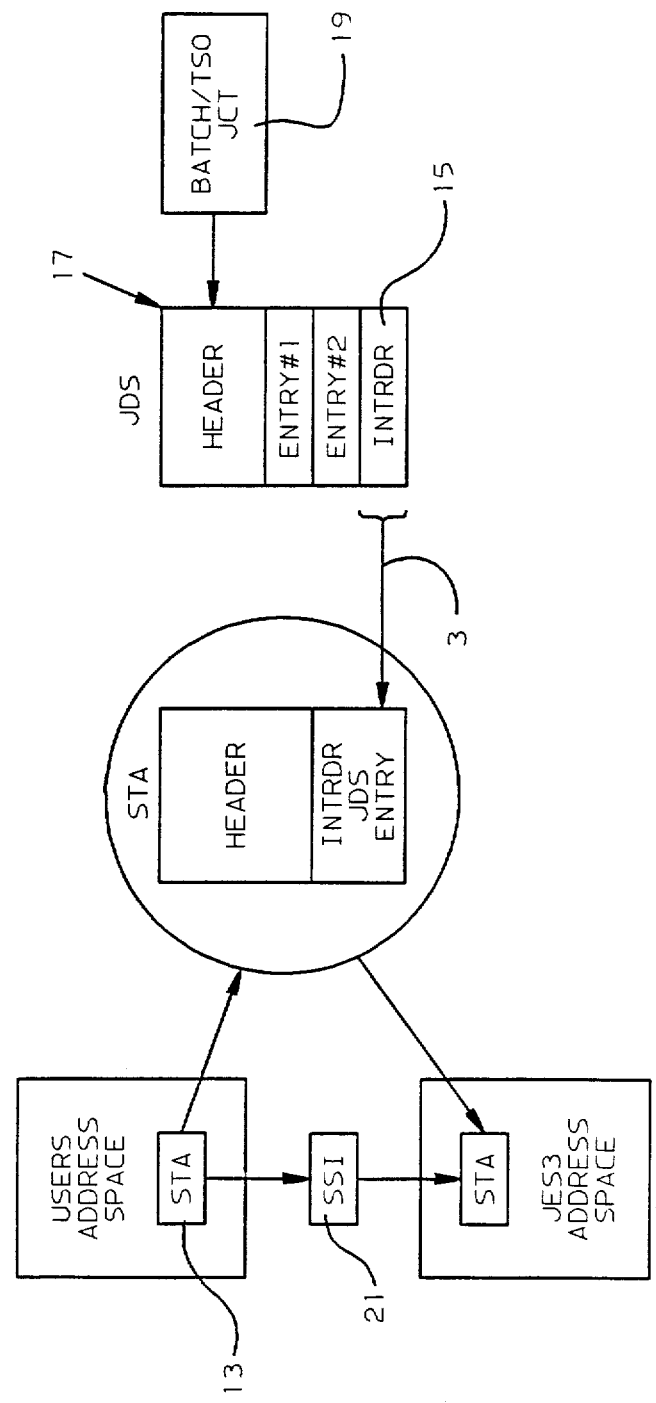
FIG. 2 is a schematic block diagram of the STA and the JDS of a job in which an entry in the JDS is copied to the STA.
Figure 3:
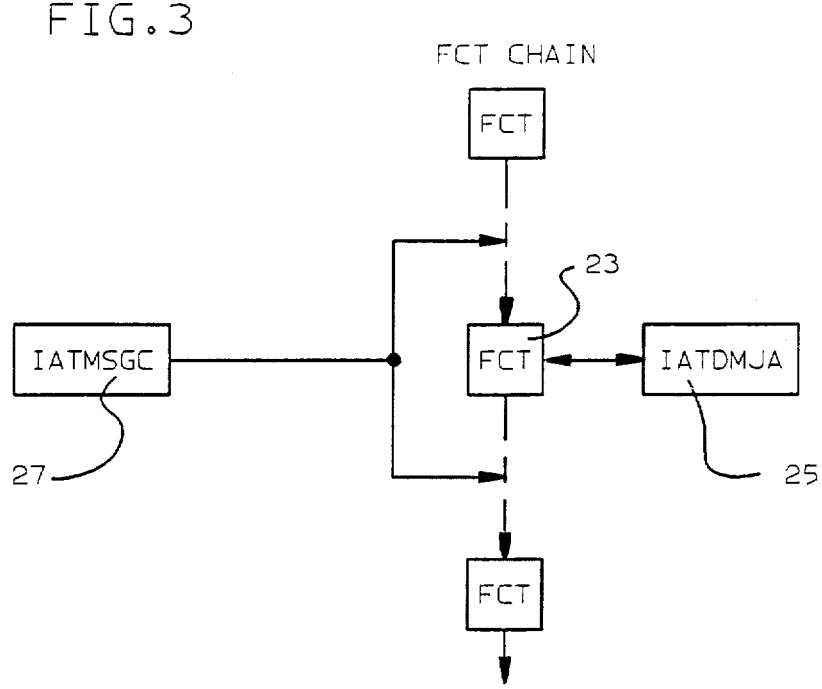
FIG. 3 is a schematic block diagram of the FCT chain in which an FCT entry created by IATMSGC points to the STA.

When an input job stream is submitted to the JES3 internal reader, MVS/XA will dynamically create an internal reader data set. In general, this involves assigning spool space for the data set in the form of track groups (on a direct access storage device), and creating a JDS entry in the JDS control block representing (associated with) a batch or TSO user job (JCT). As discussed above, the JDS entry in the JDS control block points to the spool spaces containing the data set. As shown in FIG. 2, when MVS/XA is ready to submit the input job stream, contained in the internal reader data set, to JES3, it will create a staging area (STA) 13 in the user's address space. This STA 13 contains all of the information needed by the JES3 address space in order to process the SSI request, e.g. the destination code. The address of the internal reader data set JDS entry 15 is copied to STA 13 as shown via line 3 in FIG. 2. This entry in STA 13 is copied from JDS control block 17 which is associated with a batch or TSO user job 19. The STA 13 is then transmitted to the JES3 address space via SSI 21. The IATMSGC module gets the address of the STA 13 and processes it in the JES3 address space. As shown in FIG. 3, the IATMSGC module 27, instead of calling the IATDMJA module to process the JDS entry, now creates and schedules a new FCT control block 23. The newly created FCT block is initialized to run with IATDMJA 25 as the DSP driver module. The new FCT block 23 is inserted into the existing FCT chain, by the IATMSGC module 27 as shown in FIG. 3, in order of its priority, and contains a pointer to the STA in the JES3 address space, i.e. saves the address of the STA in the FCT. (This is an exception to the usual processing where FCTs are created and added to the existing FCT chain by the JSS in response to scheduler elements in the JES3 JCT.) The IATMSGC module then searches for another STA to process in the JES3 address space. The new FCT, i.e. FCT 23 will eventually be dispatched by the MFM.

Figure 4:
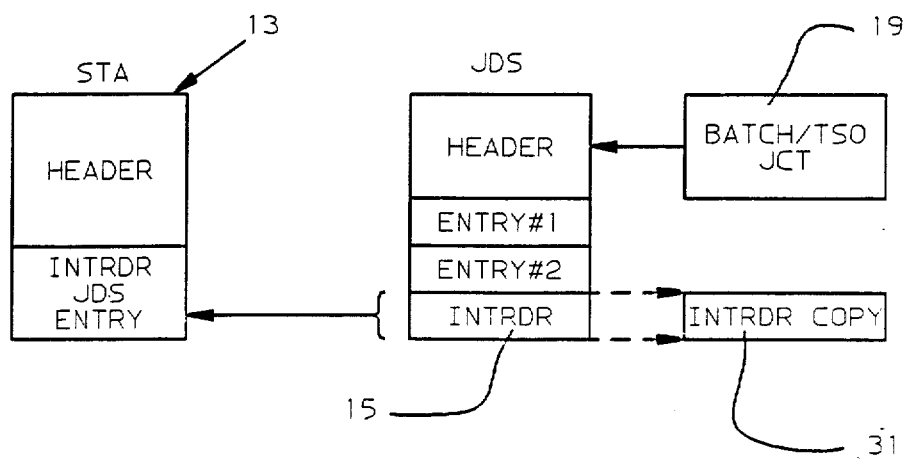
FIG. 4 is a schematic block diagram of the job JDS from which an entry in the JDS is transferred directly to the subsystem.

The IATDMJA driver module 25 runs asynchronously from the IATMSGC module 27 by first retrieving the STA, retrieving the internal reader data set JDS entry (INTRDR) 15 from spool, i.e. the batch or TSO user's JDS 17, making a local copy of the entry 15, i.e. INTRDR copy 31, as shown in FIG. 4, and clearing or "zeroing out" the original JDS entry (INTRDR) 15. This effectively transfers "ownership" of the internal reader data set initially created by either the batch or TSO user job to (directly) JES3. A job number is obtained and module IATDMJA then calls module IATISCD to process the JDS entry (INTRDR copy 31) containing the input job stream.

Figure 5A:
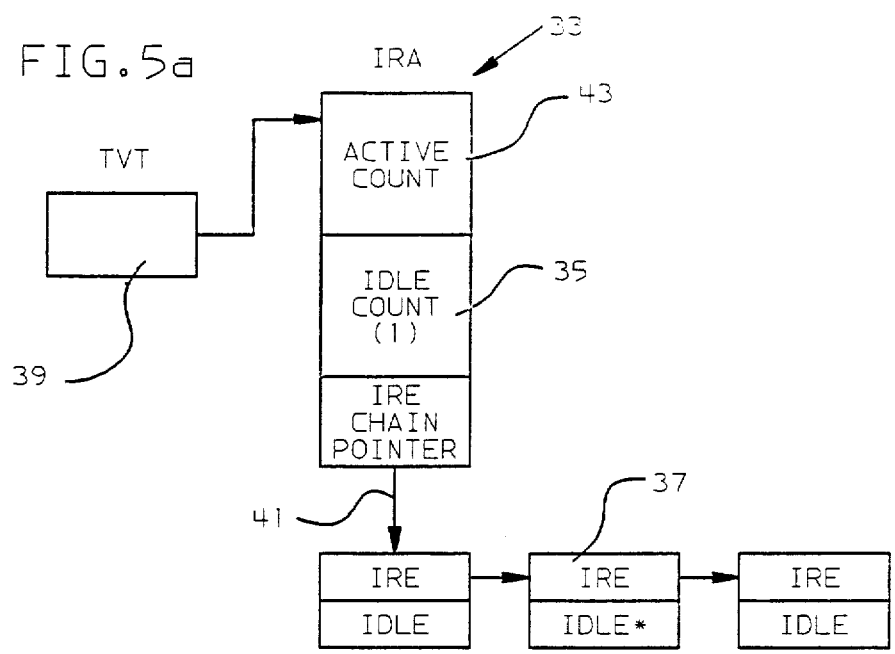
FIG. 5a is a schematic block diagram of an IRA and the IRE chain that keep track of the internal readers that process the data set identified by the JDS entry transferred to the subsystem.

Referring to FIG. 5a, module IATISCD creates and initializes a new internal reader anchor (IRA) block 33, if one doesn't exist. The IDLE counter 35 in the IRA block indicates how many internal reader element (IRE) blocks have their idle flags set "on", each idle IRE corresponding to an internal reader job maintained in a wait state (waiting for work) on the job queue. If the content of the IDLE counter is greater than zero, IATISCD scans the IRE chain, pointed to by the IRA block, for the first IRE block with its IDLE flag set, i.e. IDLE*, as shown in FIG. 5a. Of the three IRE blocks shown in FIG. 5a, only one is "idle", i.e. IRE 37, as indicated by the IDLE flag and by the content of IDLE counter 35. The set IDLE flag in IRE 37 indicates that the INTRDR FCT, e.g. FCT 24 in FIG. 6, associated with (idle) IRE 37 has completed processing an input job stream assigned to it and is waiting (available) for more work, i.e. another input job stream. The INTRDR FCT 24 is idle or in a wait state. If there is no INTRDR JCT in the wait state on the job queue (no idle IRE is found), the IATISCD will create INTRDR JCT 53, along with its associated JMR 55, JDS 57 and JDAB 59 control blocks (described above) as shown in FIG. 5b. The JDS entry, i.e. INTRDR copy 31, will be copied into the new (and only) JDS entry (INTRDR second copy 61) corresponding to the newly created INTRDR JCT 53. The IATISCD module will then add the INTRDR JCT to the existing JCT chain (job queue) in JES3 where it will eventually be scheduled by JSS. The IATISCD module also increments the ACTIVE counter 4.3 in the IRA (shown in FIG. 5a) by one. The new INTRDR JCT 53 further includes two scheduler elements, i.e. INTRDR scheduler element 63 and PURGE scheduler element 65 which will be represented on the FCT chain by DSPs which perform the work required by the scheduler elements.

That is, IATISCD will copy the JDS entry (INTRDR copy 31) into the JDS of an (existing) internal reader job in JES3. If there are no internal reader jobs available, IATISCD will create one and add it to the JES3 JCT (job) queue. If the IATISCD module is returned in error, the job number acquired for the new job is returned. In any case the STA is returned to the calling module, and the IATDMJA FCT 24 is removed from the FCT chain. (The SPINOFF macro is not issued since IATDMJA does not submit the data set for spinoff processing.) As a result, JOBO (and its JDS chain) and the output service are not used to schedule and "track" an internal reader job between the time that the original data set is created and the time that an internal reader processes it. That is, only the JES3 input service directly handles the data sets that are routed to internal readers. Data sets destined for the internal reader are not queued on the output service hold queue. That is, module IATISIR does not create a work selection parameter area.

As shown in FIG. 5a, the IRA block 33 is pointed to by the JES3 transfer vector table (TVT) 39 in the JES3 address space. (The TVT contains: the addresses of most of the control blocks in the JES3 address space, the entry point addresses of most of the JES3 services and the status information for all JES3 function.)

The IRA contains information needed by JES3 to control the scheduling of internal reader jobs and serves as an anchor for (points to) the chain of IRE blocks as indicated by arrow 41. It contains a count of how many internal reader jobs (JCTs) were created by the IATISCD module (content of ACTIVE counter 43) as well as a count of how many of those jobs are waiting for work (content of IDLE counter 35).

Each IRE block in the IRE chain shown in FIG. 5a, corresponds to each subsequent internal reader DSP found in JES3, i.e. for each INTRDR FCT representing a DSP scheduled by JSS in response to an INTRDR scheduler element found in an INTRDR JCT previously created by the IATISCD module. One IRE block is associated with an INTRDR FCT. The IRE block contains information used by JES3 in controlling the scheduling of individual internal reader DSPs.

Figure 6:
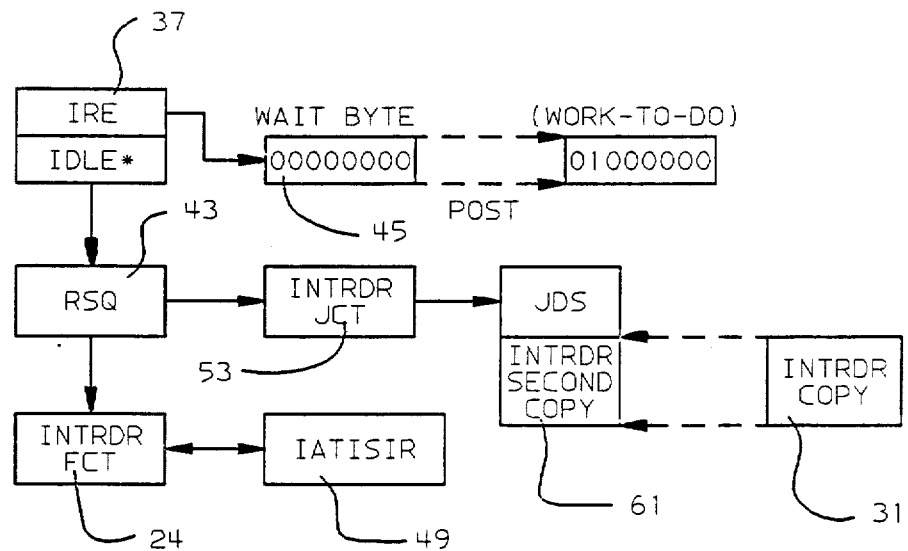
FIG. 6 is a schematic block diagram that shows the relationship between an idle IRE, RSQ, FCT, internal reader JCT and internal reader JDS.

As indicated above, IATISCD scans the entire IRE chain, starting with the first IRE block pointed to by the IRA block, until it finds an IRE, e.g. IRE block 37, that represents an idle internal reader FCT, e.g. FCT block 23. As shown in FIG. 6, the idle IRE block 37 points to the RESQUEUE (RSQ) 43 which points to the idle INTRDR FCT 23. The RSQ is used to locate the JDS for a job when the INTRDR FCT becomes idle. The driver module for the INTRDR FCT is the IATISIR module 49. The idle flag in IRE 37 indicates that IATISIR has finished processing a previous internal reader data set and is waiting for another one. This waiting is done via a WAIT/POST interface shown in block 280 in FIG 11. IATISIR will enter a wait state by designating a byte 45 of storage as its WAIT BYTE and initializing it to zero. JES3 will not reschedule the INTRDR FCT until this byte has been changed. When the byte is changed, it is called POSTING. Each bit in the byte can represent a different posting condition. For example, the wait byte for IATISIR has a work-to-do bit and a cancel bit. The address of the WAIT BYTE for the INTRDR FCT belonging to the selected idle INTRDR FCT is in the associated IRE block as shown in FIG. 6.

When an idle INTRDR FCT is found, the IATISCD module copies the internal reader data set JDS entry (INTRDR copy 31) into the first (and only) JDS entry (INTRDR second copy 61) of the INTRDR JCT 53 pointed to by RSQ 43. The IATISCD will get the WAIT BYTE 45 address from IRE 37 and post IATISIR 49 with a work-to-do request (binary 01000000). The IATISCD module will turn "off" (reset) the IDLE flag in IRE 37 and decrement the IDLE counter 35 in IRA 33. The INTRDR FCT 24 can then be rescheduled by the MFM to process the internal reader data set, i.e. an input job stream, pointed to by the JDS entry.

Figure 7:
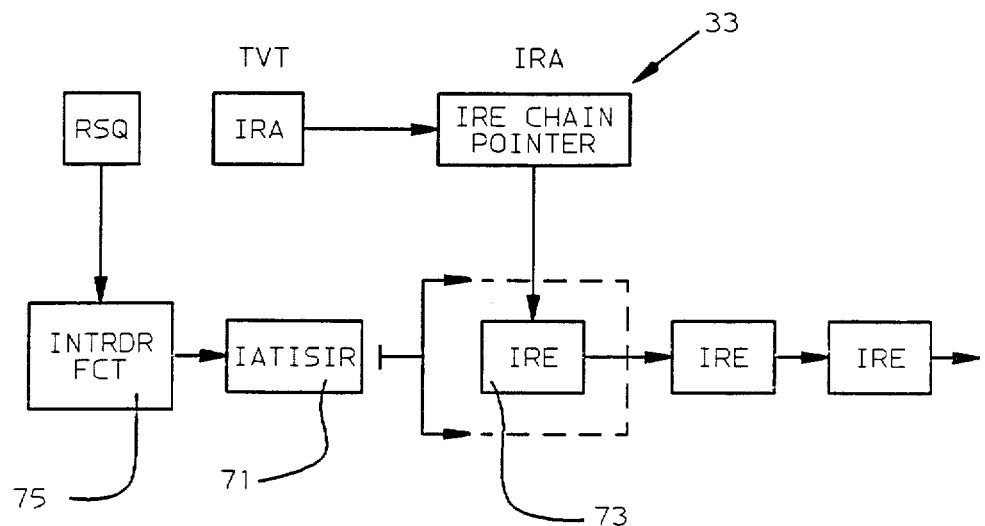
FIG. 7 is a schematic block diagram showing the creation of an IRE by IATISIR and its addition to the IRE chain when an internal reader job is to be processed.

When JSS processes the INTRDR scheduler element 63 in the INTRDR JCT 53, it will create an INTRDR FCT 75 as shown in FIG. 7. The driver module for the INTRDR FCT is IATISIR 71. When the INTRDR FCT is first scheduled by the MFM, IATISIR will create an IRE block 73 to represent it (as conceptually shown in FIG. 7). This IRE will be added at the beginning of the IRE chain. The IATISIR module will then invoke JES3 input service, i.e. the IATISDV module, to process the input job stream pointed to by the INTRDR JCT's JDS entry (INTRDR second copy 61). When JES3 input service (IATISDV) has completed, it will return control to IATISIR. IATISIR will then determine if the INTRDR FCT it represents is needed to handle the current system work load. The detail as to how IATISIR makes this determination is provided below.

Figure 5B:
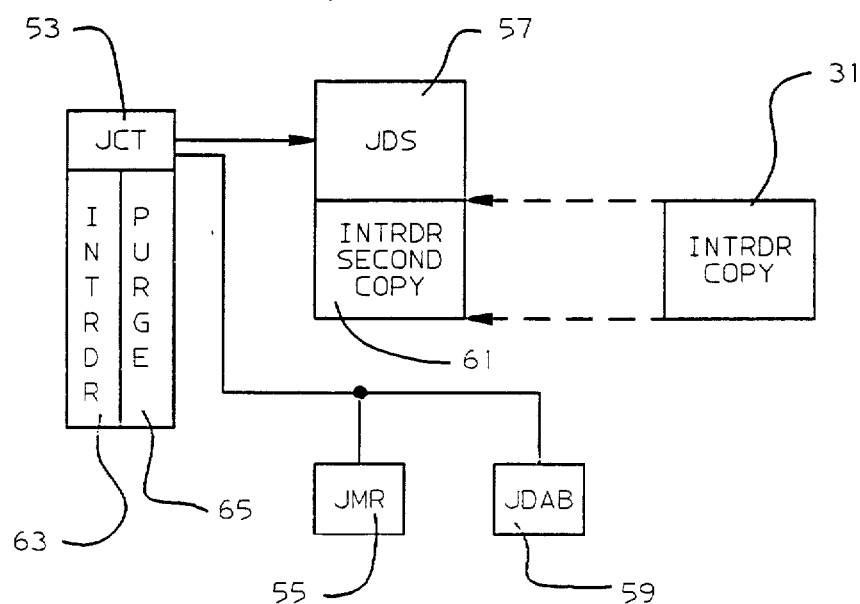
FIG. 5b is a schematic block diagram of an internal reader JCT and corresponding internal reader JDS which receives the JDS entry transferred to the subsystem.

Once work is assigned, i.e. an internal reader job is scheduled by JSS, the module IATISDV is loaded and called by the IATISIR module to process the work. Notice that the IATISDV module does not issue a macro (IATXOSPC) to obtain work, i.e. an internal reader data set, from output service as before. Instead, the JDS entry, i.e. data for the IATISDV module, can be obtained directly and immediately from the internal reader job JDS (INTRDR second copy 61 as shown in FIG. 5b) instead of from the output service, i.e. instead of from the JOBO JDS. Upon return from the IATISDV module (when the processing of the job stream has been completed), control will be returned to the IATISIR module which will cancel the internal reader if the INTRDR FCT was cancelled by the operator or by the IATISCD module because of JDS problems, or if the number of idle internal reader jobs is beyond a predetermined limit, or if the number of active INTRDR FCT is greater than the maximum INTRDR DSP count. (This latter cancellation occurs to prevent internal reader jobs that cannot be scheduled from waiting on the JES3 job queue.) If it is determined that the INTRDR FCT may still be needed to handle the current system workload and should not be canceled, IATISIR will go into a wait state. When a new data set is created, the IATISCD module will copy its JDS entry (INTRDR copy 31) to the JDS (INTRDR second copy 61) of the internal reader job (INTRDR JCT 53) and force IATISIR out of its wait state. IATISIR will then call IATISDV and repeat the above process. If there is no work to do, the INTRDR FCT is cancelled. Cancelling the internal reader job involves removing the IRE block from the chain, decrementing the ACTIVE counter in the IRA and returning control to JSS. Note that the IATDMJA module is no longer invoked by the IATMSGC module to process JOBO which previously kept track of the spin off data sets created by JES3 DSPs. As a result of the improvements made to the internal reader function, the scheduling and "tracking" of internal reader jobs has been optimized while at the same time the number of steps invoked in the processing of jobs has been reduced.

Using module IATISCD, internal reader jobs are now dynamically (automatically and continuously) created (and scheduled) and canceled. The operator is no longer required to guess how many internal readers to schedule. As the system work load increases, JES3, through IATISCD, automatically creates new internal readers (jobs) or assigns the work to previously created internal readers (jobs) which have finished their processing and are waiting. To handle the dynamic processing of data sets, the above-described control block structure has been created to keep track of internal reader jobs.

Figure 9:
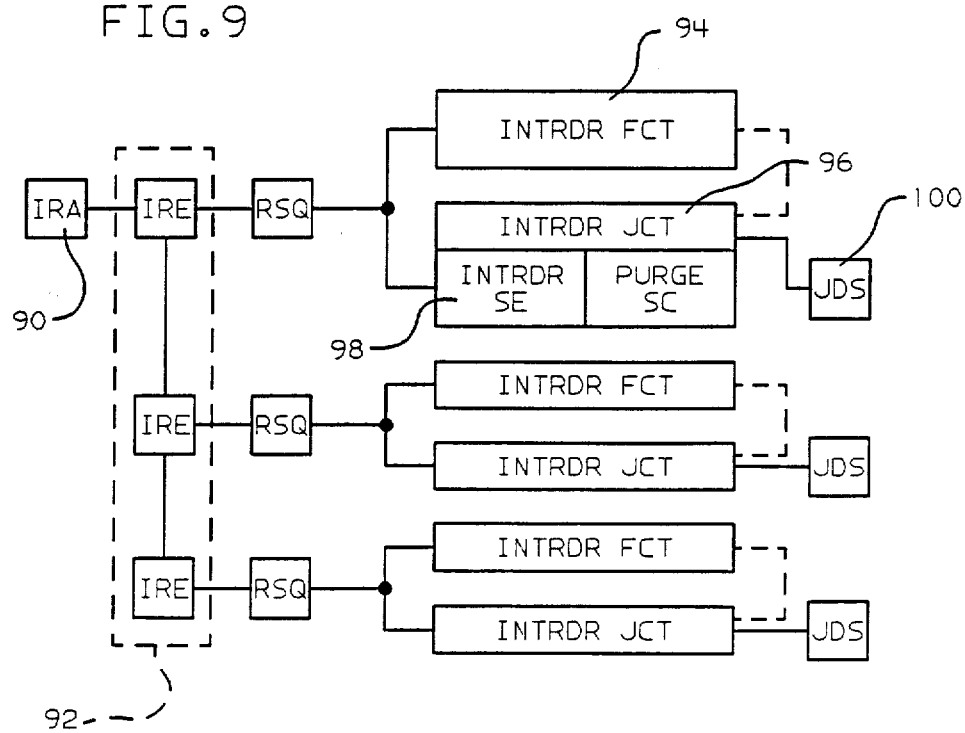
FIG. 9 is a schematic block diagram of the components of the internal reader function to include SEs, additional internal reader jobs and their association with FCTs.

FIG. 9 combines all of the important elements of the improved internal reader function described in detail above. An IRA block 90 points to an IRE chain 92 wherein each IRE block in the chain points to a RSQ. Each RSQ points to an internal reader FCT, e.g. INTRDR FCT 94, which is part of the FCT chain. Each scheduler element, i.e. the INTRDR SE 98, is represented on the FCT chain by a DSP which performs the work required for that specific scheduler element in the internal reader JCT, e.g. INTRDR JCT 96. Each internal reader job has a JDS, e.g. JDS 100 corresponding to INTRDR JCT 96, which contains an entry that points to the data set containing the job-created input stream to be processed. The JSS selects each scheduler element that is ready to be processed by dispatching the DSP to perform the work required by the scheduler element. In this case, the INTRDR SE 98 transfers a job-produced input stream, identified by an entry in JDS 100, directly to JES3 input service programs, e.g. IATISDV, for processing. The driver module for each DSP associated with an INTRDR scheduler element is IATISIR.

Figure 10:
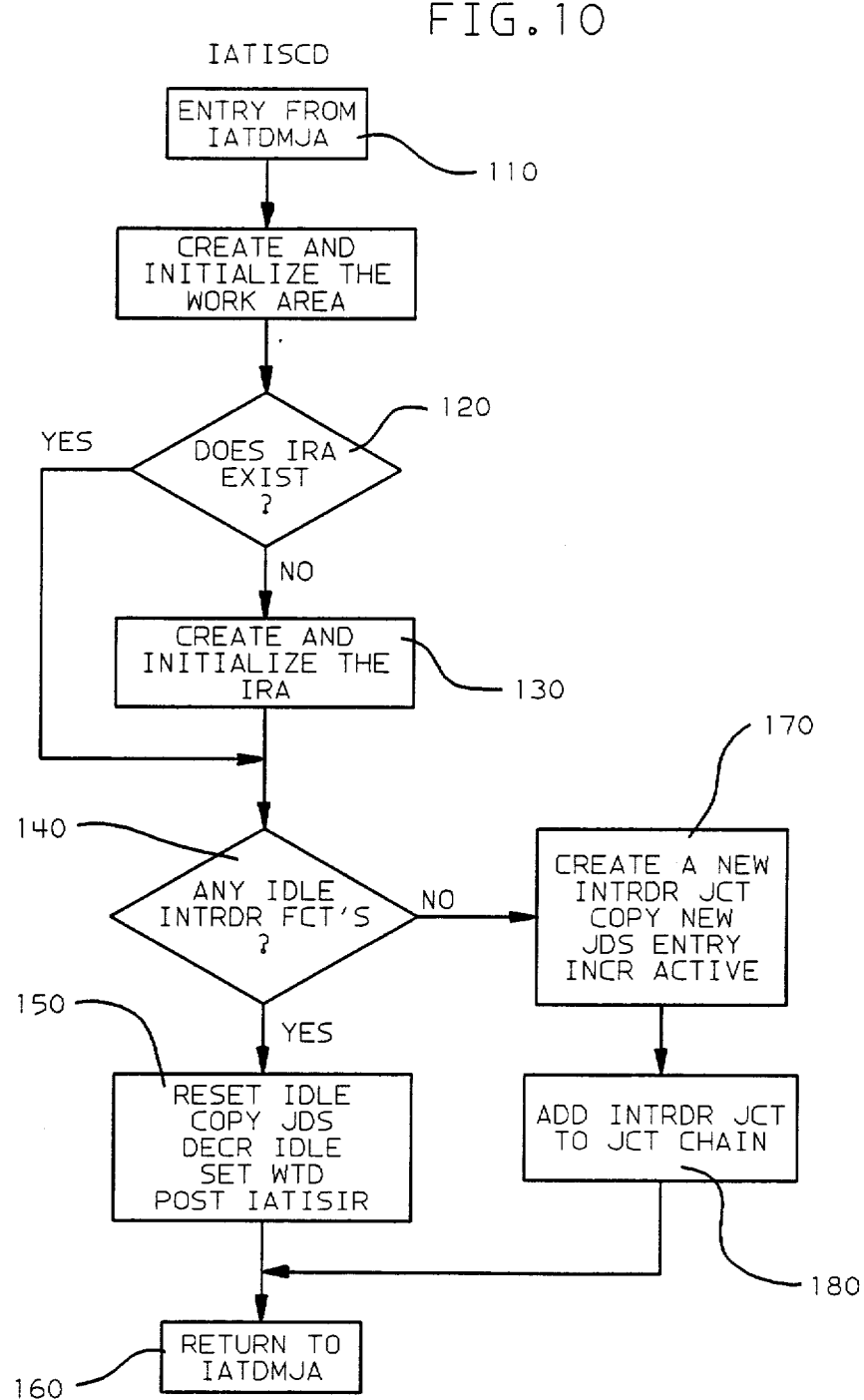
FIG. 10 is a flowchart showing the steps taken to determine if idle FCTs exist for processing a data set pointed to by an entry in an internal reader JDS.

In summary, as shown in the flowchart in FIG. 10, the IATISCD module, which is called by IATDMJA at block 110, determines whether the IRA block exists at block 120. (If the IRA block does not exist, the IATISCD creates and initializes it as shown at block 130.) The IATISCD module then scans the current chain of IRE control blocks (IATYIREs) pointed to by the IRA, and searches for an idle internal reader job (INTRDR FCT) as indicated by decision block 140. If an IDLE internal reader job is found, the "new" data set in the JDS entry is added (copied) to the previously idle internal reader job JDS. The IDLE counter is decremented and the IDLE flag is reset in the IRE as shown by block 150. The work-to-do flag is set, IATISIR is posted, and return is normally made to the IATDMJA module as shown by block 160. However, if an internal reader job is not found, the IATISCD module creates a new internal reader job by creating and initializing several JES3 job control blocks as suggested by block 170. A JCT is now created for the internal reader job and initialized and added to the JCT job queue as indicated by block 180. All new control blocks are written out and the new internal reader job structure is added to the JES3 input service (job queue). The ACTIVE counter is then incremented in the IRA. If any errors were encountered in any of the above steps, return is made to the IATDMJA module.

IATISIR

Figure 11:
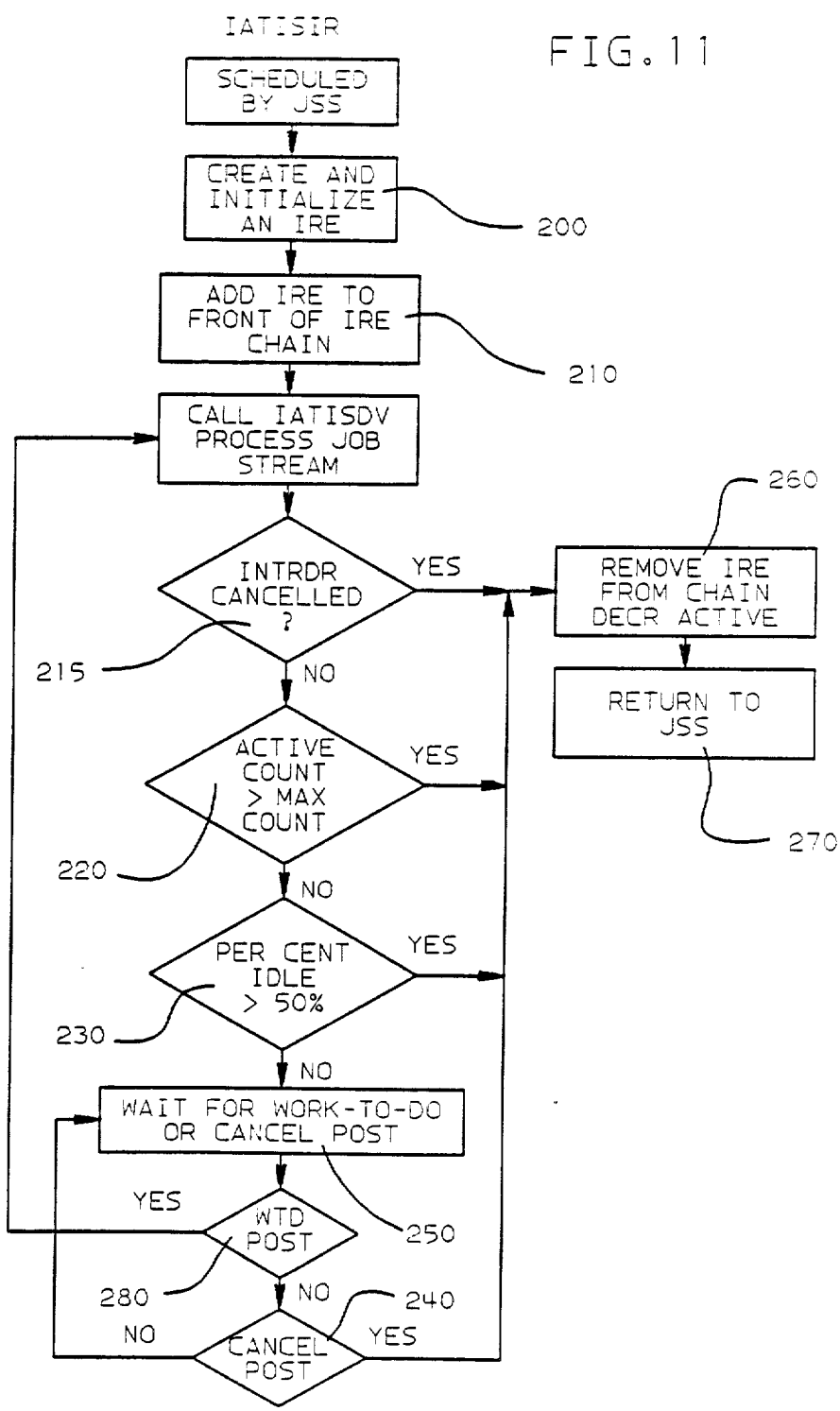
FIG. 11 is a flowchart showing the steps taken to determine if an internal reader job should be cancelled and the cancel/post or wait/post states.

Optimization occurs when IATISIR obtains control from IATISDV and determines whether the INTRDR FCT recently used is still needed to handle the current system workload. To make this determination, IATISIR, which is shown in the flow chart in FIG. 11, performs the following process:

The IATISCD module creates and initializes a new internal reader element (IRE) block (IATTIRE) for the scheduled internal reader job in JES3 (which is then 200 and 210 in FIG. 11.

1. If JSS encounters a scheduler element representing a DSP which is already at the maximum DSP count, i.e. the maximum number of FCTs allowed, it will not schedule the scheduler element. If IATISIR determines that the active internal reader count in the IRA (ACTIVE counter 43 in FIG. 5a) is greater than the current maximum DSP use count as indicated by block 220 in FIG. 11, then there is at least one internal reader job (at least one INTRDR JCT on the JES3 job queue which will not be scheduled (until the INTRDR DSP "use" count is decremented by canceling an active job. IATISIR will then decide to cancel its internal reader (INTRDR FCT) and provide for (make room for) another (waiting) INTRDR FCT to be scheduled as suggested by blocks 240 and 250 in FIG. 11. Otherwise, INTRDR JCTs will exist on the JCT chain which cannot be scheduled by the JSS until one or more currently running INTRDR FCTs are cancelled. (The maximum DSP (use) count indicates the maximum number of INTRDR FCTs that JSS can create and schedule at any one time. The ACTIVE count indicates the number of INTRDR JCTs created and scheduled by IATISCD.)

2. IATISIR will determine the percent of internal reader jobs (INTRDR FCTs) which are IDLE, i.e. the ratio of the idle (INTRDR FCTs) count to the active (INTRDR JCTs) count. If, by making the current internal reader job, i.e. the INTRDR FCT, idle the percent of idle internal reader jobs is greater than fifty percent as indicated by block 230 in FIG. 11, then the IATISIR will proceed to cancel this internal reader job (INTRDR FCT) as indicated by block 240 in FIG. 11. In such case, the IATISIR makes the assumption that the remaining INTRDR FCTs (those not cancelled) will be sufficient to handle the current system work load. However, if canceling the INTRDR FCT will cause the active INTRDR FCT to go below a predetermined lower limit, e.g. 2, then the INTRDR FCT will not be canceled in order to ensure that there will always be enough INTRDR FCTs available to handle a sudden influx in system work load. IATISCD will always maintain a minimum number of internal reader jobs. This is true even if the percentage of idle internal reader jobs exceeds fifty. (For this embodiment, the minimum number is two.)

Figure 8:
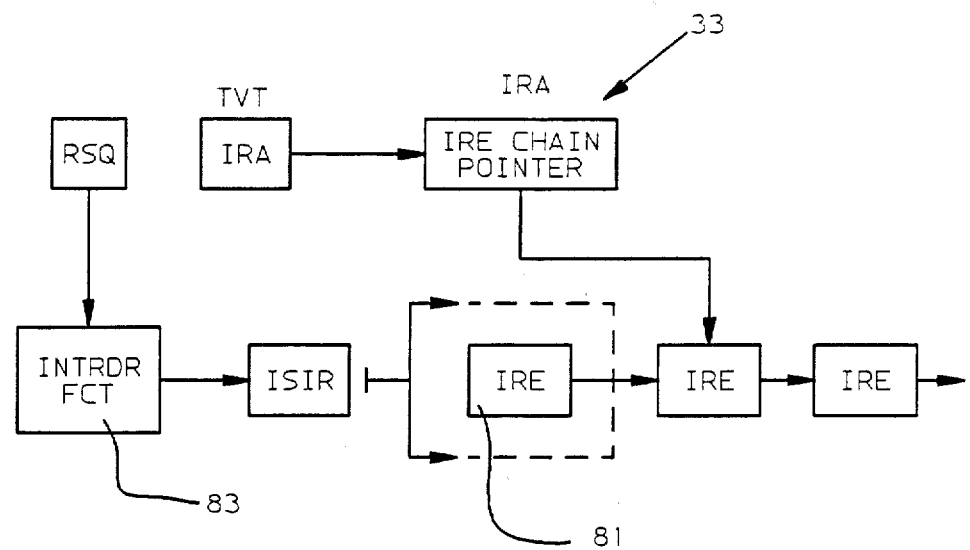
FIG. 8 is a schematic block diagram showing the removal of an IRE following the cancellation of an FCT by IATISIR.

The IATISIR module will also cancel the INTRDR FCT if it receives a cancel post (binary 10000000) in its WAIT BYTE, e.g. WAIT BYTE 45 shown in FIG. 6 and in block 215 in the flowchart of FIG. 11. This can occur if the system operator cancels the INTRDR FCT via the system console while IATISDV is still processing the internal reader data set. The INTRDR FCT cancel processing is shown in FIG. 8. The IRE 81 corresponding to a cancelled INTRDR FCT 83 is removed from the IRE chain. The internal reader ACTIVE counter 43 in IRA 33 is decremented by one. If the INTRDR FCT was idle when it was canceled, the internal reader IDLE counter 35 is also decremented by one. Control will then be returned to the JSS which schedules the PURGE scheduler element from the INTRDR JCT. (A PURGE scheduler element 65 is shown in FIG. 5b as part of INTRDR JCT 53.)

If any of the above conditions causes the internal reader (INTRDR FCT) to be canceled by IATISIR, the IRE will be removed from the IRE (chain) queue and all of the counters will be appropriately updated as suggested by block 260 in FIG. 11. Return will be to JSS, which will remove the INTRDR FCT from the FCT chain, decrement the INTRDR DSP "use" count and process the INTRDR JCT purge scheduler element at block 220 in FIG. 11. Otherwise, IATISIR will be in the wait state to wait for more work (another data set to process) from IATISCD (or for a cancel post) as indicated by block 250 in FIG. 11. That is, after deciding to keep the INTRDR FCT to handle the current system workload, IATISIR will set its WAIT BYTE to zero, set its IRE IDLE flag, increment the IDLE counter (in the IRA) by one and wait for work to be done or a cancel post. If IATISIR detects a work-to-do post (see FIG. 6), IATISIR will again call JES3 input service, i.e. IATISDV, to process the new input job stream, and then repeat the above-described process. If the system operator enters a cancel (INTRDR) command during the processing of this new data set, IATISIR will detect a cancel post and will cancel the INTRDR FCT.

Since each data set submitted to an internal reader is assigned directly to an internal reader job JDS, the length of time between submitting a data set and being able to locate the data set, e.g. by using a TSO STATUS command, is much shorter than in the prior art. (The actual length of time is a function of the maximum DSP count for INTRDR DSPs and the total activity of the operating system. Both variables affect the number of DSPs that get scheduled as well as how fast the DSPs get scheduled.) Also, since JOBO processing has been eliminated for internal readers and the IATDMJA module is no longer invoked by the IATMSGC module, the competition between JOBO processing and demand select jobs has been removed. In large, interactive systems, the average TSO LOGON time is significantly reduced.

It has been clearly shown that an INTRDR FCT is dynamically and optimally invoked and scheduled by the operating system (and not by the operator) in response to the workload. The maximum number of INTRDR FCTs scheduled by the job scheduler subsystem (JSS) is determined by the maximum INTRDR DSP count.

JOBO Enhancement

As was indicated above, JOBO no longer provides JDSs to internal readers. As a result, the amount of spool I/0 is decreased during internal reader data set processing and delays due to a JDS being in use by other jobs are eliminated. That is, the spool device does not have to be accessed for each SRF record in the JOBO JDS SRF chain. Therefore, JOBO throughput has been increased for other JES3 DSP data sets because there will not be a "bottleneck" caused by the presence of internal reader data sets on the JOBO JDS. Additional advantages due to JOBO enhancement are the reduced average TSO LOGON time in larger interactive environments, and the greater accessibility of jobs submitted to the internal reader. In the latter case, job status is more quickly determined when user and system inquiries are made because each job is assigned to a dynamic internal reader FCT. In the former case, even though JOBO will still be available to process other DSP (spinoff) data sets, the contention between it and TSO LOGON processing is reduced. Therefore, LOGON processing will not be slowed down by inordinate spool I/0 needed to search the chained SRF records of JOBO's JDS on a peripheral storage device. If a job is submitted via the TSO SUBMIT command, and that job in turn submits another job, i.e. specifies an output data set with SYSOUT=(*INTRDR) to be handled by an internal reader, the TSO user information will be propagated for each subsequent job.

There is a certain amount of processing overhead to just create an internal reader job. This overhead is worthwhile if there is suddenly an influx of work which the existing internal reader jobs cannot handle. Once all available work has been processed, an internal reader job can terminate, due to the implementation of this invention, rather than wait until a new job is dispatched. However, if the rate of incoming work is such that as soon as an internal reader terminates itself, another one must be created, the system is considered to be thrashing. Thrashing incurs an inappropriate amount of software overhead. The invention, by its very nature, is capable of eliminating this condition.

Other advantages of the invention include the fact that internal reader jobs can be easily started and stopped, that internal reader jobs can wait for work or become idle, that internal reader jobs can terminate themselves, that the number of actively processing internal reader jobs is determinable, and that the number of idle internal reader jobs is determinable.

In general, the invention disclosed herein dynamically increases and decreases the number of internal reader jobs available to handle the changing (increasing and decreasing) flow of work, while, at the same time, avoiding excessive system overhead, and thrashing. The invention improves system performance without increasing the complexity of the system for the programmer or operator, e.g. by increasing the number of program externals.

As a result of the invention disclosed and claimed herein, operators are no longer required to start internal readers after a JES3 cold start, or to start additional internal readers if a backlog of internal reader data sets begins to accumulate in the JES3 hold queue. A designed job is now read into the system by the input service under the control of an INTRDR FCT. An important advantage is that the system now has the opportunity to initiate multiple, parallel-running I/0 operations involving multiple queues since the multiple jobs allow multiprogramming.

While the invention has been particularly shown and described with references to referred embodiments thereof, it will be understood by those skilled in the art that the foregoing and other changes in form and details may be made therein without departing from the spirit and scope of the invention.

What we claim as new and desire to secure by Letters Patent is:

1. A method for operating a computer system which includes an operating system that communicates with a subsystem which prepares a job for execution by said operating system, a support program that processes a unit of work required by said job, a function control table chain in which one entry in said chain corresponds to said support program, a scheduler element in said job being represented on said function control table chain by said support program which corresponds to said unit of work that must be performed by processing said job and a data set containing an input stream created by said job, said method comprising the steps of:
  (a) associating said data set directly with a job data set control block which is associated with a dynamically created and dynamically terminable internal reader job;
  (b) creating and adding to a function control table entry in said function control table chain an internal reader support program corresponding to a scheduler element in said internal reader job and scheduling said function control table entry; and
  (c) dispatching said internal reader support program and processing said data set which was associated directly with said job data set control block.

2. The method of claim 1 in which said subsystem input process automatically cancels said function control table entry when the number of active internal reader jobs is greater than the maximum number of function control table entries allowed, thereby providing for a waiting function control table entry to be scheduled.

3. The method of claim 2 in which said subsystem input process automatically cancels said function control table entry when the percent of idle function control table entries in greater than fifty percent and the number of function control table entries remaining exceeds a predetermined number following the cancellation of said function control table.

4. The method of claim 1 in which said internal reader job becomes idle and is in a wait state on a job queue following said processing of said data set.

5. The method of claim 4 having an internal reader element chain that includes an internal reader element block corresponding to said internal reader job on said job queue.

6. The method of claim 5 in which said internal reader element block includes an idle flag that is set when said internal reader job is in said wait state on said job queue.

7. The method of claim 6 in which said internal reader element block points to an idle function control table entry in said function control table chain corresponding to said internal reader job which is in said wait state on said job queue.

8. The method of claim 7 in which said function control table entry pointed to by said internal reader element block having said idle flag set is rescheduled to process a different data set when said different data set is transferred directly to a job data set control block associated with said idle internal reader job and said idle flag in said internal reader element block corresponding to said idle internal reader job is reset.

9. The method of claim 8 in which said internal reader element block contains information used by said subsystem in controlling the scheduling of said internal reader job.

10. A computer system that includes an operating system that communicates with a subsystem which prepares a job for execution by said operating system, a support program that processes a unit of work required by said job, a function control table chain in which one entry in said chain corresponds to said support program a scheduler element in said job represented on said function control table chain by said support program which corresponds to said unit of work that must be performed to process said job and a data set containing an input stream created by said job, having an improved subsystem comprising:
  means for automatically creating and cancelling, as workload to said system increases and decreases, internal reader processes that sets directly to said subsystem when one of said data sets is directly copied to a data set control block associated with one of said internal reader jobs.

* * * * *

UNITED STATES PATENT AND TRADEMARK OFFICE
CERTIFICATE OF CORRECTION

PATENT NO. : 4,918,595
DATED : April 17, 1990
INVENTOR(S) : Kenneth A. Kahn, et al.

It is certified that error appears in the above-identified patent and that said Letters Patent is hereby corrected as shown below:

Column 20, line 34

After "that" and before "sets" insert -- transfer data --.

Signed and Sealed this

Twenty-sixth Day of March, 1991

*Attest:*

HARRY F. MANBECK, JR.

*Attesting Officer*   *Commissioner of Patents and Trademarks*